United States Patent
Lee et al.

(10) Patent No.: US 11,724,656 B2
(45) Date of Patent: Aug. 15, 2023

(54) LOW-NOISE POCKET-TYPE WHEEL GUARD

(71) Applicants: Hyundai Motor Company, Seoul (KR); Kia Motors Corporation, Seoul (KR)

(72) Inventors: Jong-Hyun Lee, Gyeonggi-do (KR); Byung-Chul Son, Gyeonggi-do (KR); Eric Jin Ser Lee, Gyeonggi-do (KR); Ju-Wan Yi, Gyeonggi-do (KR); Dong-Gwan Roh, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/871,854

(22) Filed: May 11, 2020

(65) Prior Publication Data
US 2021/0206332 A1   Jul. 8, 2021

(30) Foreign Application Priority Data
Jan. 8, 2020   (KR) .................. 10-2020-0002431

(51) Int. Cl.
*B60R 13/08* (2006.01)
*B62D 25/18* (2006.01)

(52) U.S. Cl.
CPC .......... *B60R 13/0861* (2013.01); *B62D 25/18* (2013.01)

(58) Field of Classification Search
CPC ............................ B60R 13/0861; B62D 25/18
USPC .................................................. 296/39.3
See application file for complete search history.

(56) References Cited

U.S. PATENT DOCUMENTS

2018/0218722 A1* 8/2018 Onishi ................ G10K 11/168
2020/0307716 A1* 10/2020 Nishino ................ B62D 25/18

FOREIGN PATENT DOCUMENTS

| CN | 203844553 U | * | 9/2014 | |
|---|---|---|---|---|
| CN | 208931465 U | * | 6/2019 | |
| JP | 11011354 A | * | 1/1999 | |
| JP | 2004168174 A | * | 6/2004 | |
| JP | 2018002021 A | * | 1/2018 | |
| JP | 2018008682 A | * | 1/2018 | |
| JP | 6734717 B2 | * | 8/2020 | |
| KR | 101714254 B1 | | 3/2017 | |
| WO | WO-2013018284 A1 | * | 2/2013 | ............. B62D 25/16 |

OTHER PUBLICATIONS

Machine translation of JP 717 (Year: 2020).*
S. W. Hwang, M. J. Bang, G. H. Rho, and C. T. Cho, "The study on tire Pattern Noise," the spring conference collected papers of the Korean Society for Noise and Vibration Engineering, pp. 310 to 313, 2006).

* cited by examiner

*Primary Examiner* — Hilary L Gutman
(74) *Attorney, Agent, or Firm* — Fox Rothschild LLP

(57) ABSTRACT

A low-noise pocket-type wheel guard is provided and includes a guard that is installed to face a surface of a tire in a vehicle, in which a noise reduction pocket is formed to protrude toward an interior of the vehicle in the guard. Since the noise reduction pocket is formed on the end portion of the wheel guard, in which a sound field is expected to be formed due to tire pattern noise, formation of a sound field due to the tire pattern noise is disturbed and prevented.

8 Claims, 12 Drawing Sheets

PROPAGATION OF TIRE NOISE

PROPAGATION OF TIRE NOISE

PROPAGATION OF TIRE NOISE

LOW-NOISE POCKET-TYPE WHEEL GUARD

CROSS-REFERENCE(S) TO RELATED APPLICATIONS

The present application claims priority to Korean Patent Application No. 10-2020-0002431 filed on Jan. 8, 2020, which is incorporated herein by reference in its entirety.

BACKGROUND

Field of the Disclosure

The present disclosure relates to a low-noise pocket-type wheel guard, and more particularly, to a low-noise pocket-type wheel guard capable of effectively removing high-pitched peak noise which is a tire pattern component and deteriorates running noise within a vehicle.

Description of Related Art

A wheel guard is installed in a vehicle to enhance an aesthetic appearance by covering a vehicle body and to prevent contaminants from a tire to the vehicle body. Meanwhile, a study has revealed that tire pattern noise is generated in a frequency range of 800 Hz to 1200 Hz while a vehicle is driving.

The tire pattern noise is recognized by a user within the vehicle due to a peak noise characteristic. Further, an acoustic constructive interference phenomenon of the tire pattern noise is generated according to a distance between a surface of the tire and the wheel guard which deteriorates the running noise heard within the vehicle.

FIG. 1 is a graph showing running noise detected within a vehicle in which a wheel guard is installed and a vehicle in which the wheel guard is not installed according to the related art. As shown in FIG. 1, when the wheel guard is installed, a peak point of the running noise detected within the vehicle is measured to be higher. When the wheel guard is installed, vibrations of a frequency corresponding to the peak point of the tire pattern noise are concentrated on a specific portion of the wheel guard to form a sound field.

According to results of analyzing the sound field of the wheel guard in the related art, a strong sound field is found to be concentrated on an end portion of one side of the wheel guard at a frequency (e.g., ranging from 800 Hz to 1200 Hz) of the tire pattern noise. Consequently, the vibrations of the frequency corresponding to the peak point of the tire pattern noise may thus be inferred to form the sound field in the wheel guard so that the peak point of the tire pattern noise is amplified. Further, since the tire pattern noise is introduced into the interior of the vehicle in a state in which the peak point is amplified, the running noise detected in the interior of the vehicle is deteriorated.

SUMMARY

The present disclosure provides a low-noise pocket-type wheel guard capable of effectively removing high-pitched peak noise which is a tire pattern component and deteriorates running noise detected in an interior of a vehicle. Other objects and advantages of the present disclosure may be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an exemplary embodiment of the present disclosure, a low-noise pocket-type wheel guard may include a guard installed to face a surface of a tire in a vehicle, wherein a noise reduction pocket may be formed to protrude toward an interior of the vehicle in the guard. Further, the guard may be formed in an arc shape, and the noise reduction pocket may include an inlet formed on an inner surface of the guard, and a space formed to protrude from the inlet toward an outer side of the guard.

The inlet may be disposed on one side of an end portion of both end portions of the guard in a rear direction of the vehicle. The guard may be formed in the shape of an arc, and the noise reduction pocket may include a first pocket disposed on one side of an end portion of both end portions of the guard in a rear direction of the vehicle, and a second pocket formed to be closer to a central portion of the guard than the first pocket.

A wavelength tube principle may be applied to calculation of a height of the space perpendicular to an imaginary line parallel to the ground and in the same direction as a driving direction of the vehicle. The height of the space may be calculated by Equation 1 below:

$$h = (1/4) \times (c/f) \quad \text{Equation 1}$$

wherein, h indicates the height of the space, c indicates the sound velocity (about 340 m/s), and f indicates a target frequency (ranging from about 700 Hz to 1400 Hz).

An expansion tube principle may be applied to calculation of a length of the inlet perpendicular to an imaginary line parallel to the ground. The length of the inlet may be calculated by Equation 2 below:

$$a = (1/2) \times (c/f) = 2 \times h, \quad \text{Equation 2}$$

wherein, a indicates the length of the inlet, c indicates the sound velocity (about 340 m/s), f indicates a target frequency (ranging from about 700 Hz to 1400 Hz), and h indicates the height of the space 220.

Further, the noise reduction pocket may be formed as two or more noise reduction pockets to be arranged toward the central portion of the guard from one side of an end portion of both end portions of the guard in a rear direction of the vehicle, and as the two or more noise reduction pockets are formed to be closer to the central portion of the guard, the target frequencies substituted into the calculations of the length of the inlet and the height of the space may be set to be smaller.

Additionally, the height of the space may include a first height that corresponds to a dimension of an edge of a lower surface of the space closest to the ground, a second height that corresponds to a dimension of an edge of an upper surface of the space farthest from the ground than the lower surface of the space, the target frequencies substituted into the calculations of the first height and the second height may be different from each other, and a small target frequency among the target frequencies substituted into the calculations of the first height and the second height may be substituted into the calculation of the length of the inlet.

The length of the inlet perpendicular to an imaginary line parallel to the ground may be determined in a range of about 12 cm to 24 cm, and the height of the space perpendicular to an imaginary line parallel to the ground and in the same direction as a driving direction of the vehicle may be determined in a range of about 6 cm to 12 cm.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present invention, and wherein.

DETAILED DESCRIPTION

Figure 1:
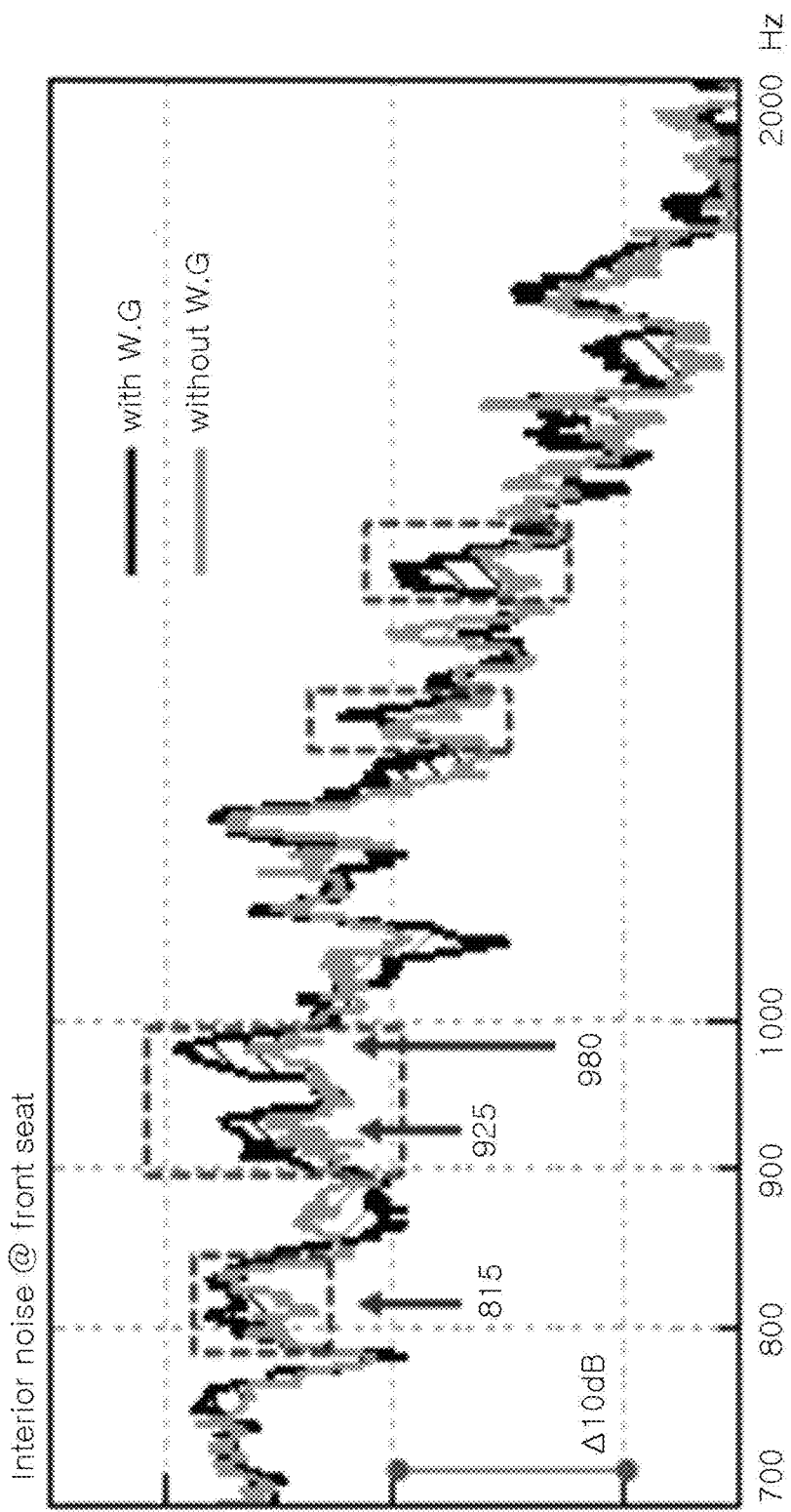
FIG. 1 is a graph showing running noise detected in an interior of a vehicle in which a wheel guard is installed and a vehicle in which the wheel guard is not installed according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a low-noise pocket-type wheel guard according to one exemplary embodiment of the present disclosure will be described with reference to the accompanying drawings.

As shown in FIGS. 2 to 6, a low-noise pocket-type wheel guard according to one exemplary embodiment of the present invention may include a guard 100 installed in a vehicle to face a surface T of a tire, and a noise reduction pocket 200 formed to protrude toward an interior of the vehicle in the guard 100. Here, the interior means a compartment of the vehicle which is located around the guard 100, except for a direction toward the ground. The guard 100 shown in FIG. 2 may be manufactured in the form of an arc shape. Additionally, the guard 100 may be manufactured to have a diameter that is greater than that of the tire based on a central point of the tire. The guard 100 may be manufactured of an iron material. A guide and the like for increasing an air flow may be formed in the guard 100.

As shown in FIGS. 3 to 6, it may be assumed that a distance d between the guard 100 and the surface T of the tire ranges from about 6 to 12 centimeters (cm). The noise reduction pocket 200 may be include an inlet 210 having a length a formed on an inner surface of the guard 100, and a space 220 formed to protrude toward the outside of the guard 100 with the length a and the height h of the inlet 210. The inlet 210 may be formed in a portion in which the sound field of the vibration frequency that corresponds to the peak point of the tire pattern noise was formed of the surface of the guard 100. The inlet 210 may be formed to have the length a that is a ½ wavelength magnitude of the vibration frequency of the peak point. The space 220 may be formed to have the height h that is a ¼ wavelength magnitude of the vibration frequency of the peak point. The ¼ wavelength magnitude may be obtained by dividing a sound velocity by the vibration frequency.

When the tire pattern noise moves along the guard 100, a wavelength that corresponds to the peak point oscillates toward the space 220 thus preventing the formation of the sound field. Further, since the sound field may be prevented from being formed in the guard 100, amplification of the tire pattern noise due to the sound field is not generated.

Figure 2:
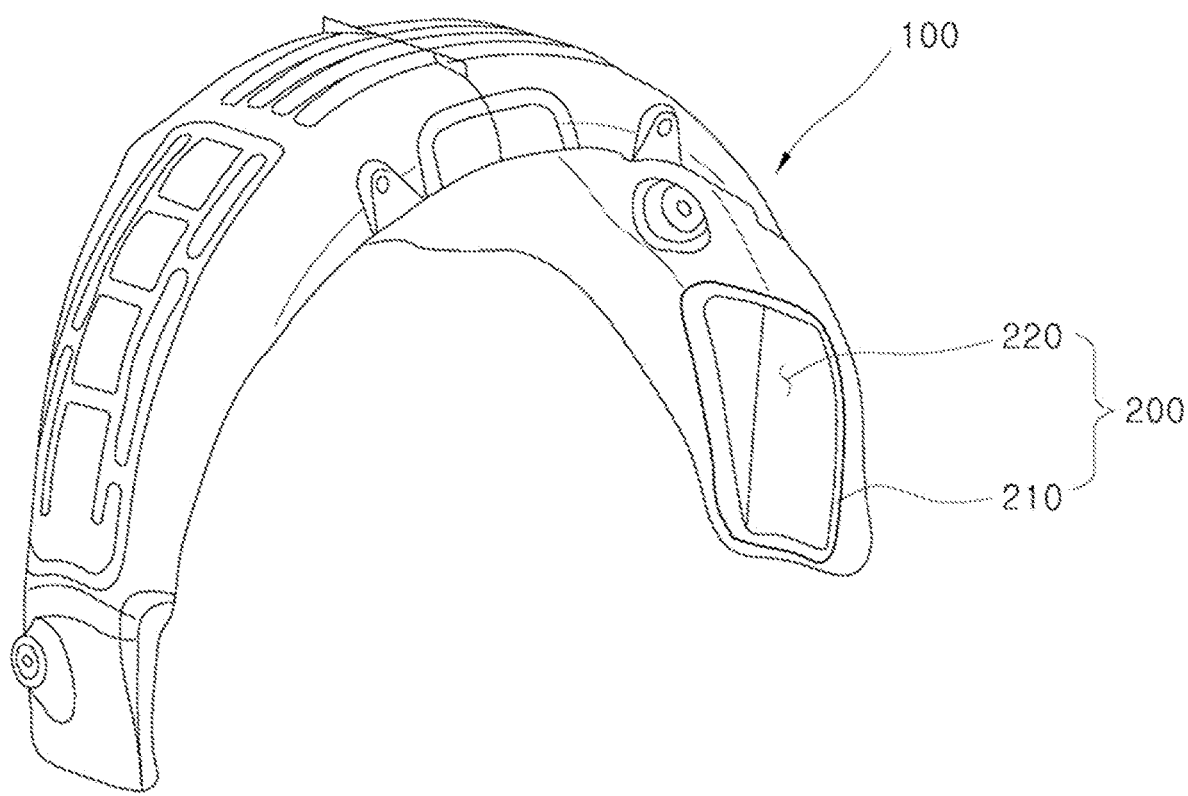
FIG. 2 is a perspective view illustrating a low-noise pocket-type wheel guard according to one exemplary embodiment of the present disclosure.
Figure 3:
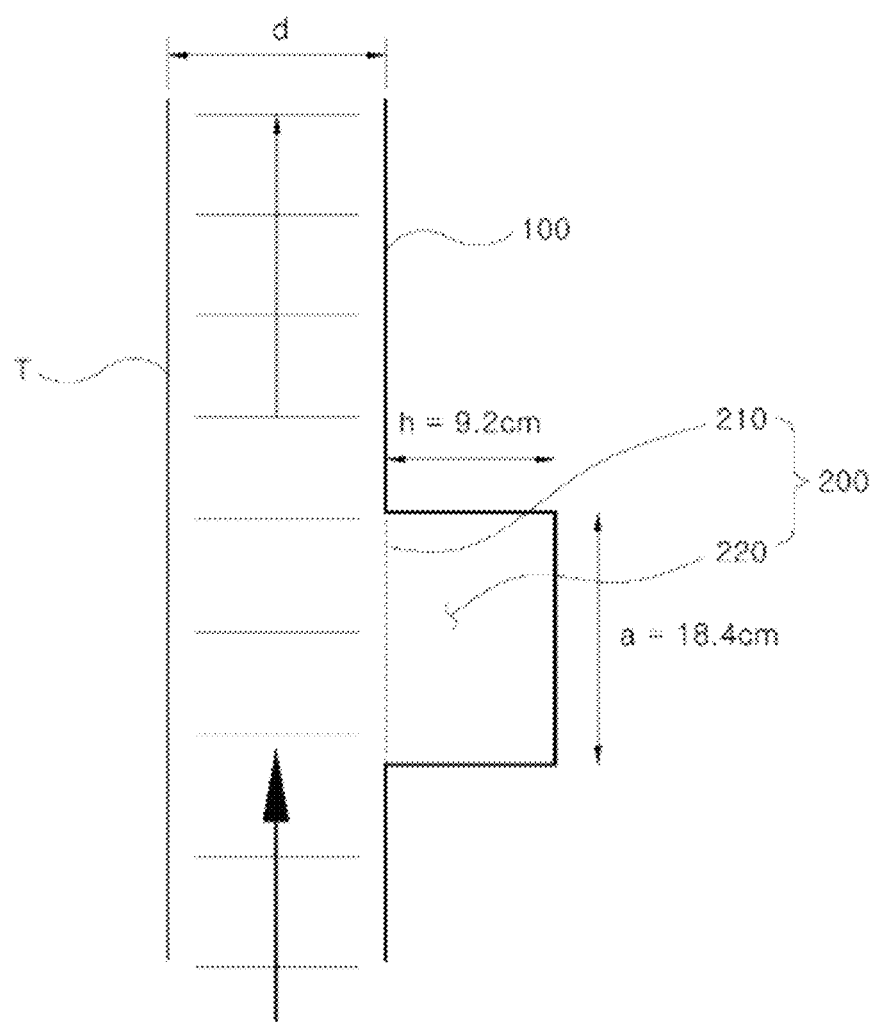
FIGS. 3 to 5 are cross-sectional views illustrating main portions of the low-noise pocket-type wheel guard of FIG. 2 according to one exemplary embodiment of the present disclosure.
Figure 3:
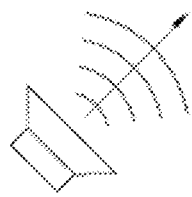
Figure 8:
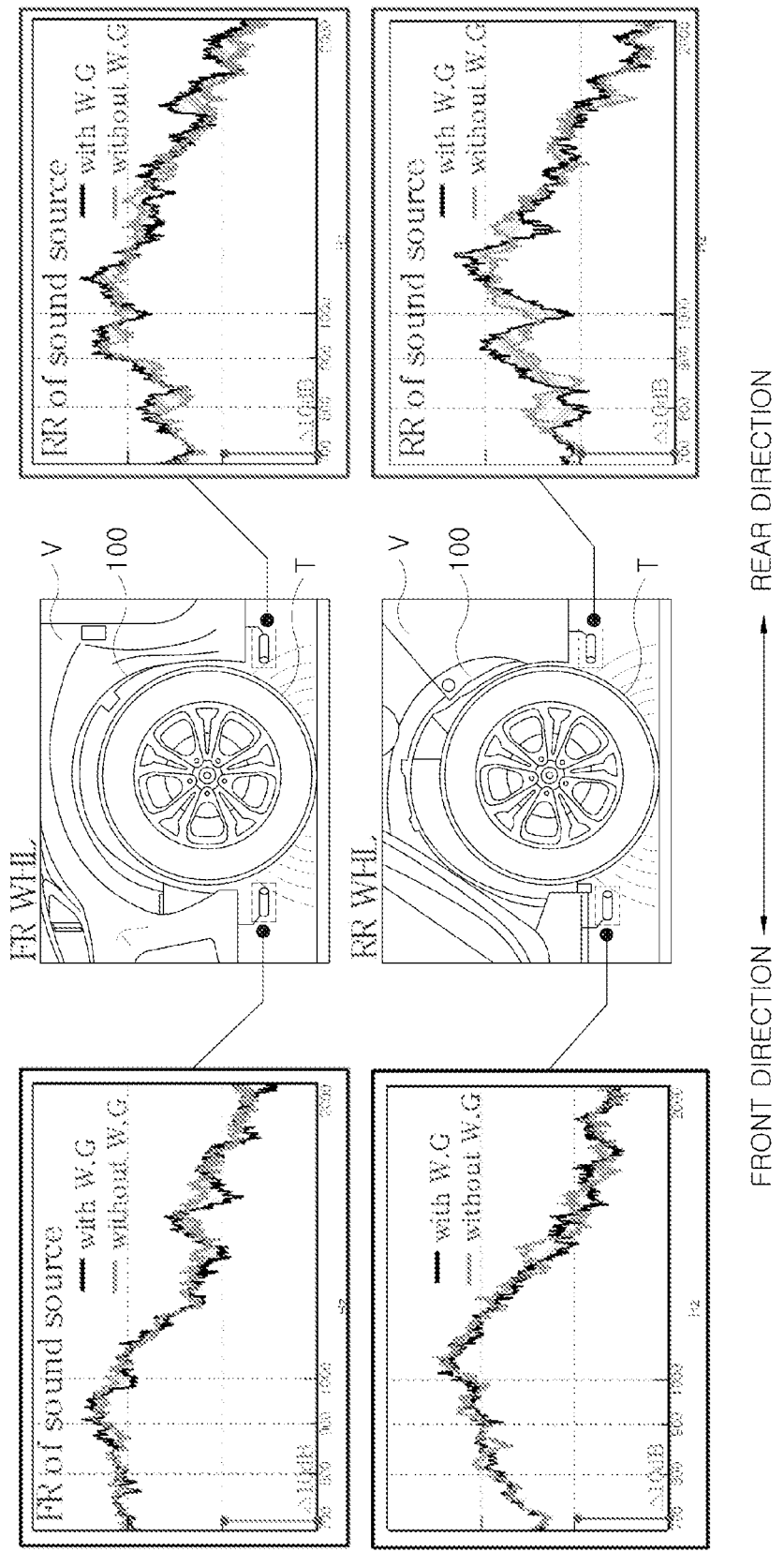
FIG. 8 shows graphs illustrating results of measuring noise in a front-rear direction of the wheel guard according to one exemplary embodiment of the present disclosure.

As shown in FIG. 2, the inlet 210 may be disposed on one side of a rear end portion of the guard 100 in a rear direction of the vehicle. As shown in FIG. 8, the vibration frequency that corresponds to the peak point of the tire pattern noise was not amplified due to the guard 100 on one side of a front end portion of the guard 100 in a front direction of the vehicle. Therefore, the noise reduction pocket 200 may not be formed on the front end portion of the guard 100 in the front direction of the vehicle.

Figure 4:
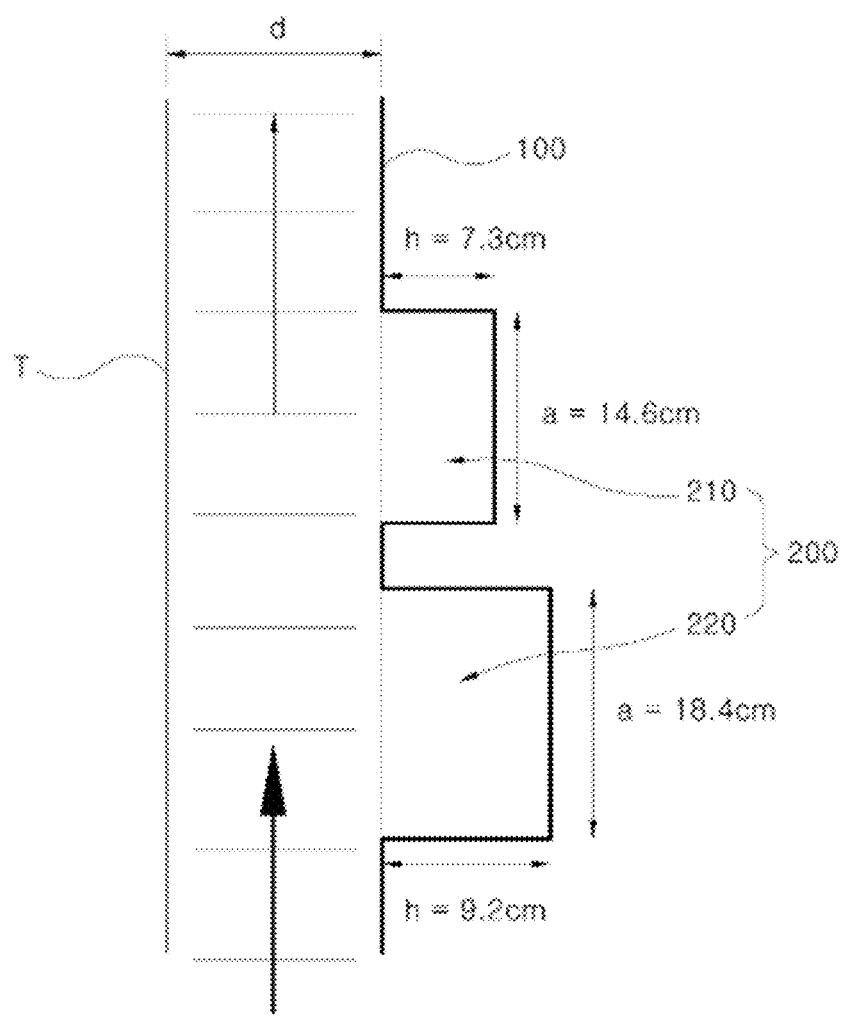
Figure 4:
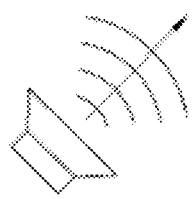
Figure 7:
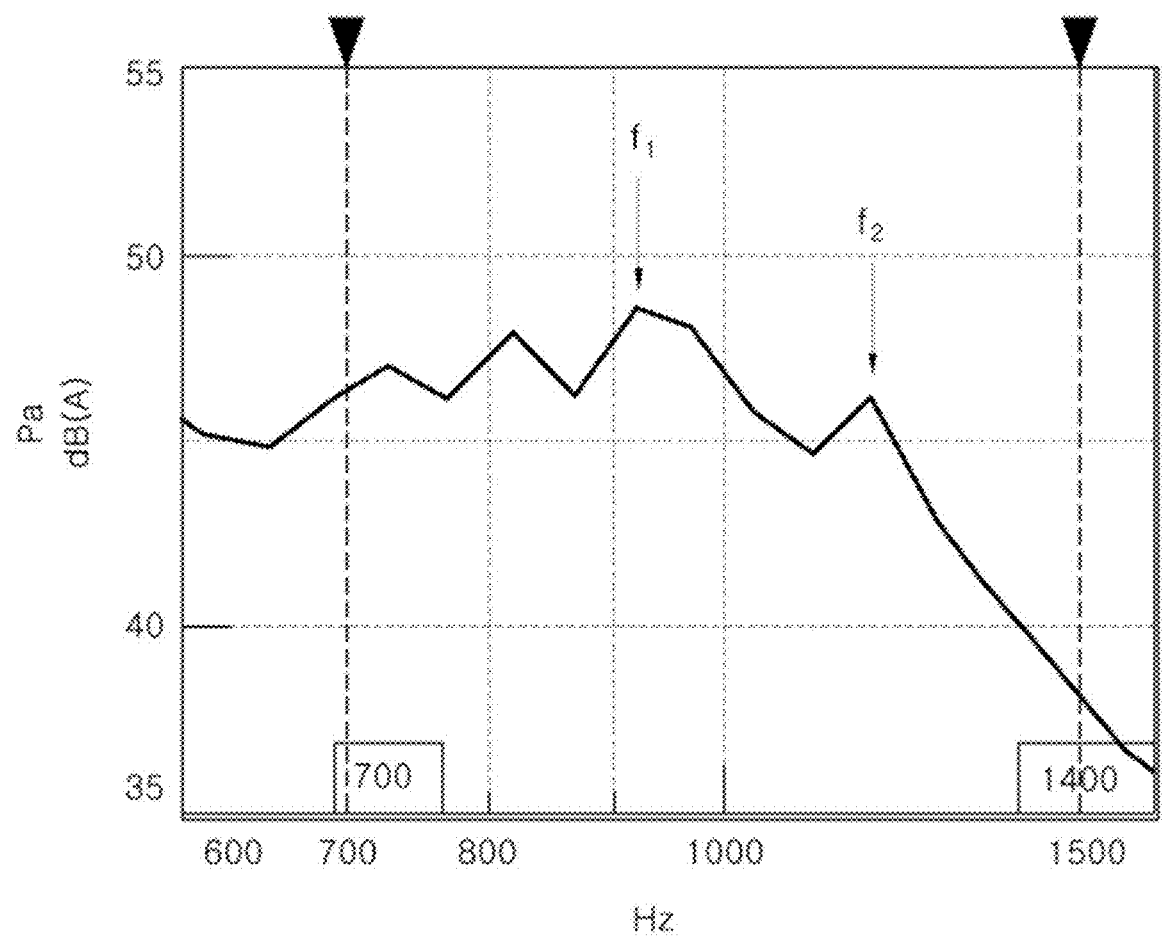
FIG. 7 is a graph in which a target frequency is set according to one exemplary embodiment of the present disclosure.

As shown in FIG. 4, the noise reduction pocket 200 may include a first pocket 201 disposed on the one side of the rear end portion of the guard 100 in the rear direction of the vehicle, and a second pocket 202 formed proximate to a central portion of the guard 100 than the first pocket 201. Since two or more noise reduction pockets 200 are formed in the guard 100, it may be possible to prevent formation of sound fields of different frequencies (see FIG. 7).

Figure 5:
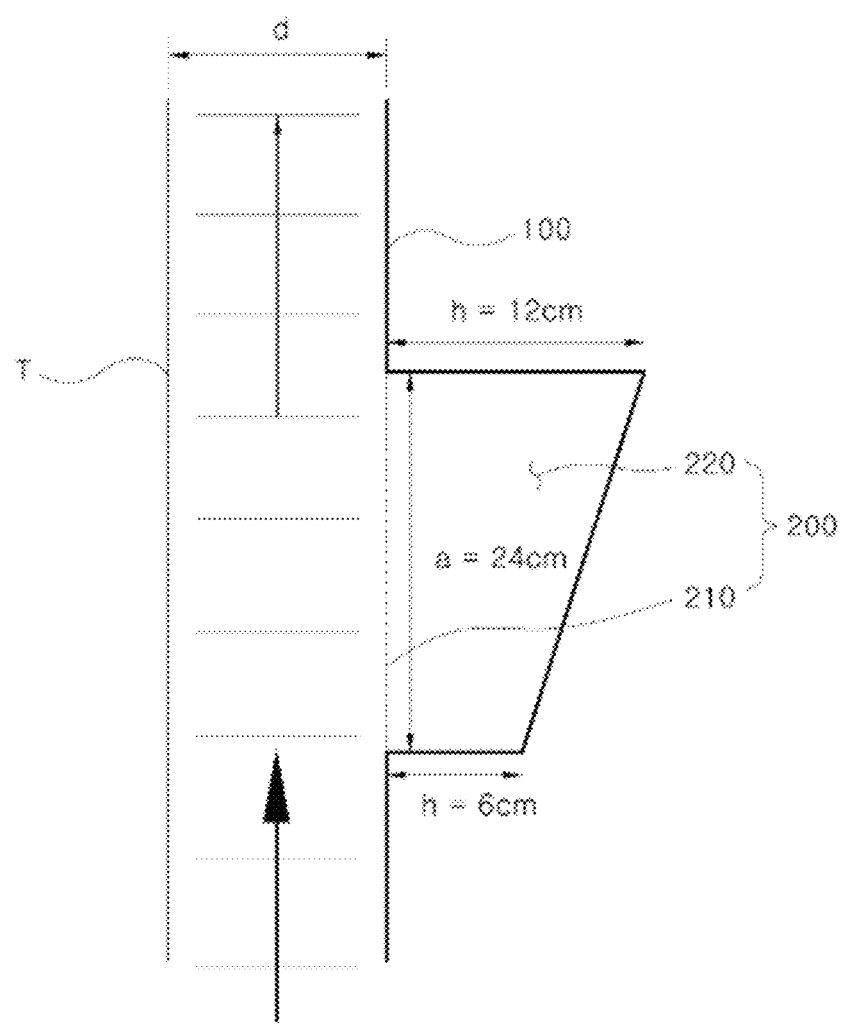
Figure 5:
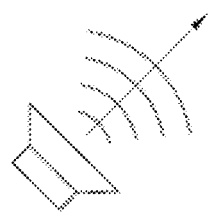
Figure 6:
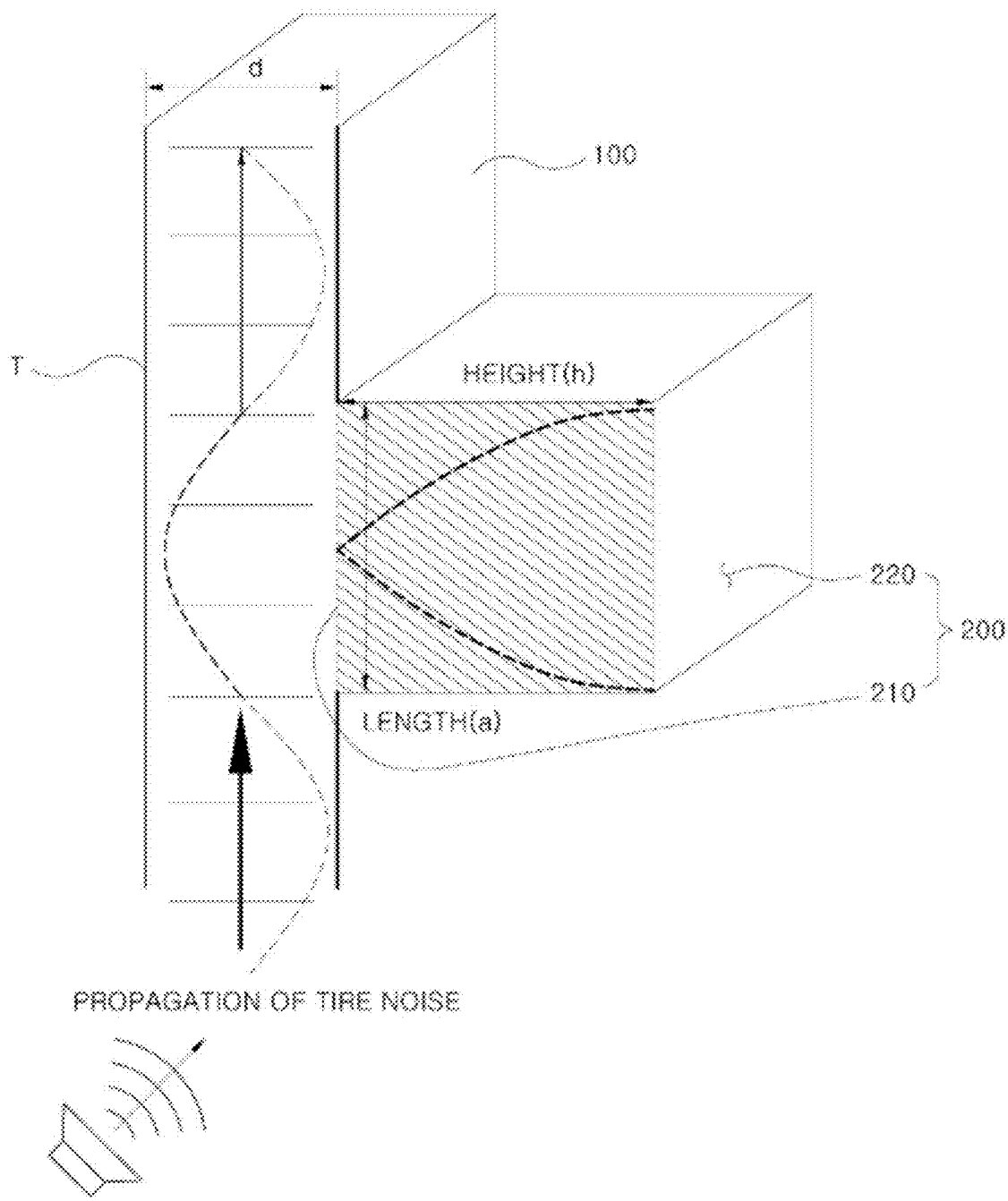
FIG. 6 is a cross-sectional view illustrating a length of an inlet and a height of a space according to one exemplary embodiment of the present disclosure.

As shown in FIG. 5, an inner wall surface of the space 220 facing a rear side of the vehicle may be formed in an inclined shape. Meanwhile, referring to FIG. 6, the length a of the inlet 210 perpendicular to an imaginary line parallel to the ground may be determined in a range of about 12 cm to 24 cm. The height h of the space 220 perpendicular to an imaginary line parallel to the ground and in the same direction as a driving direction of the vehicle may be determined in a range of about 6 cm to 12 cm. In FIG. 6, a dotted line represents a waveform of tire noise propagation.

Figure 10:
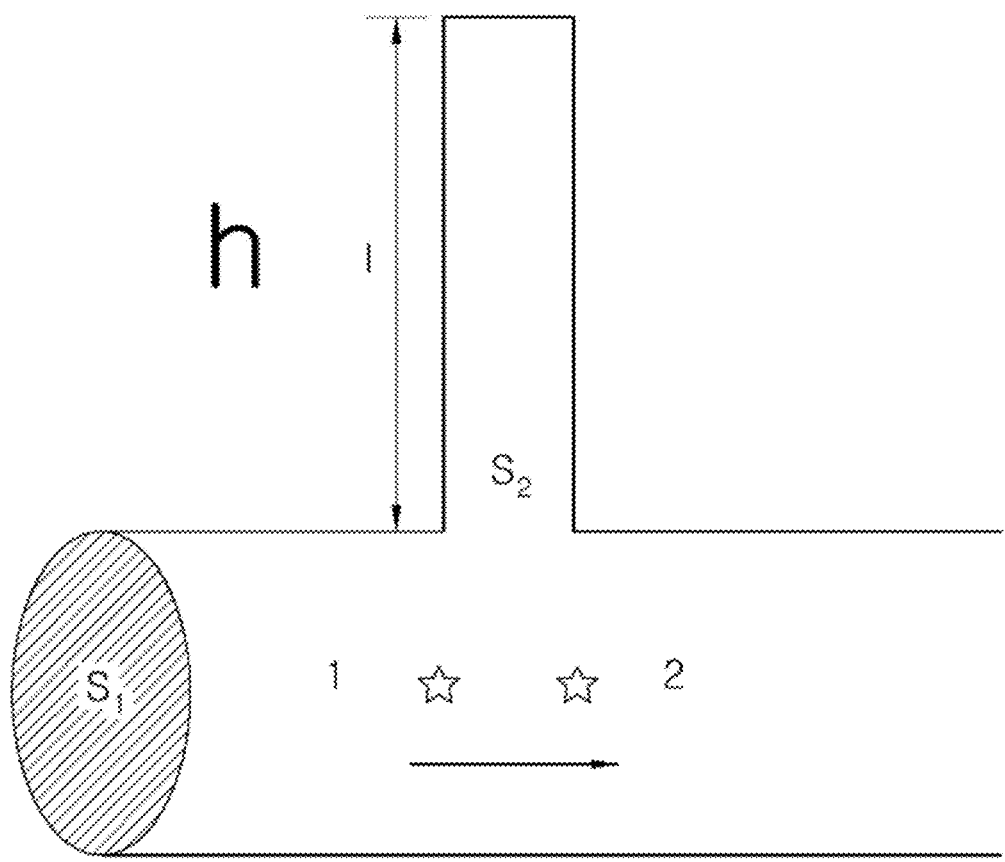
FIG. 10 is a schematic diagram illustrating a wavelength tube principle according to one exemplary embodiment of the present disclosure.
Figure 11:
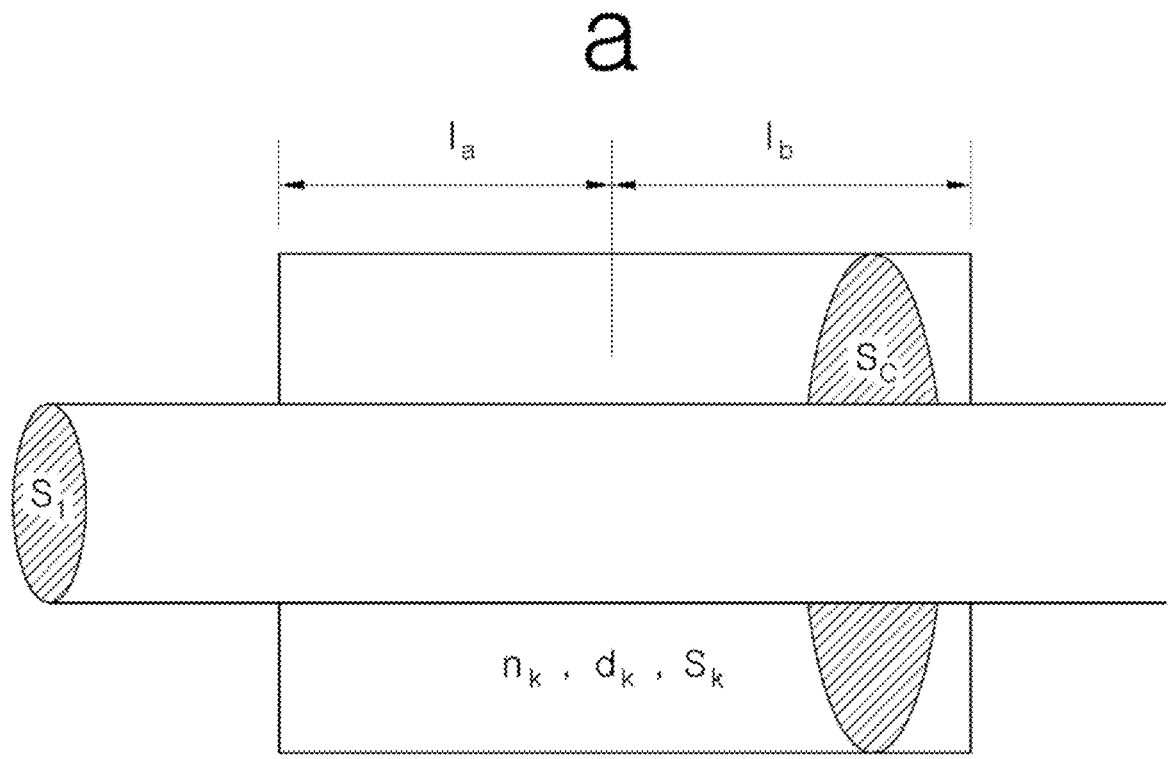
FIG. 11 is a schematic diagram illustrating an expansion tube principle according to one exemplary embodiment of the present disclosure.
Figure 12:
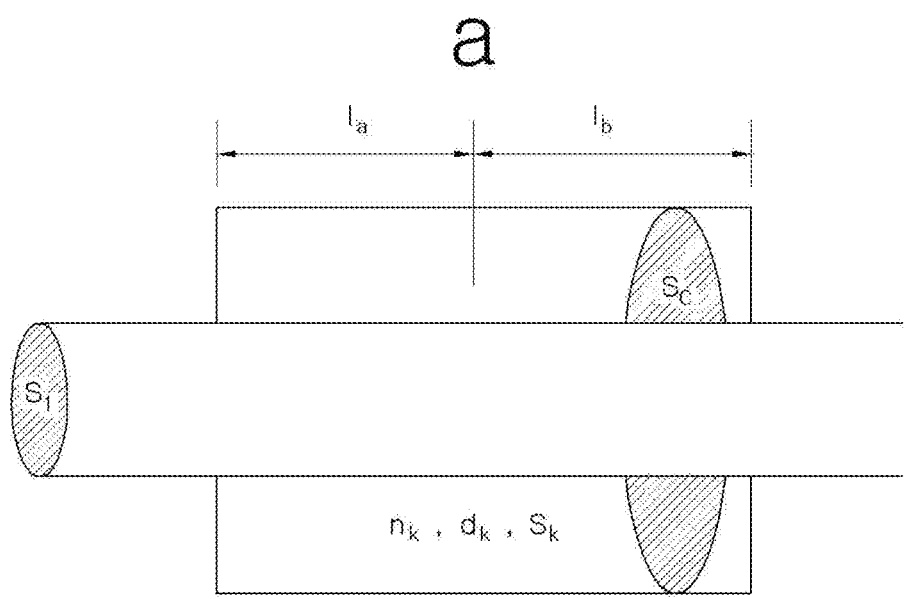

Further, the length a of inlet 210 and the height h of space 220 may be arithmetically derived from a wavelength tube principle in which a sound wave reflected from a distal end of a pipe is reversed at an inlet end to control noise at the inlet end (see FIG. 10) and an expansion tube principle of reducing transmission sensitivity of noise by suddenly varying an area to a pipe or pipeline (see FIG. 11). The height h of the space 220 perpendicular to the imaginary line parallel to the ground and in the same direction as the driving direction of the vehicle may be calculated by Equation 1 below.

$$h=(1/4)\times(c/f) \qquad \text{Equation 1}$$

wherein, h indicates the height of the space 220, c indicates the sound velocity (about 340 m/s), and f indicates a target frequency (ranging from about 700 Hz to 1400 Hz).

Further, the length a of the inlet 210 perpendicular to the imaginary line parallel to the ground may be calculated by Equation 2 below.

$$a=(1/2)\times(c/f)=2\times h, \qquad \text{Equation 2}$$

wherein, a indicates the length of the inlet 210, c indicates the sound velocity (about 340 m/s), f indicates the target frequency (ranging from about 700 Hz to 1400 Hz), and h indicates the height of the space 220.

As shown in FIG. 4, when two or more noise reduction pockets 200 are formed to be arranged toward the central portion of the guard 100 from one side of the rear end portion of the guard 100 in the rear direction of the vehicle, as the two or more noise reduction pockets 200 are formed to be closer to the central portion of the guard 100, the target frequencies substituted into calculation of the length a of the inlet 210 and the height h of the space 220 may be set to be smaller or decreased (compared to when one noise reduction pocket is provided).

As shown in FIG. 5, when an inner wall of the noise reduction pocket 200 toward the rear side of the vehicle is inclined, the target frequency may be set as follows. In the height h of the space 220, when a dimension of an edge of a lower surface of the space 220 closest to the ground is referred to as a first height h1, and a dimension of an edge of an upper surface of the space 220 farther from the ground than the lower surface of the space 220 is referred to as a second height h2, different target frequencies may be substituted into calculation of the first height h1 and the second height h2. Further, a small target frequency among the target frequencies substituted into the calculation of the first height h1 and the second height h2 may be substituted into the calculation of the length a of the inlet 210.

As described above, in accordance with the low-noise pocket-type wheel guard according to one exemplary embodiment of the present disclosure, the noise reduction pocket 200 may be formed on the end portion of the wheel guard, in which a sound field is expected to be formed due to the tire pattern noise, formation of the sound field due to the tire pattern noise may be disturbed and prevented.

Figure 9:
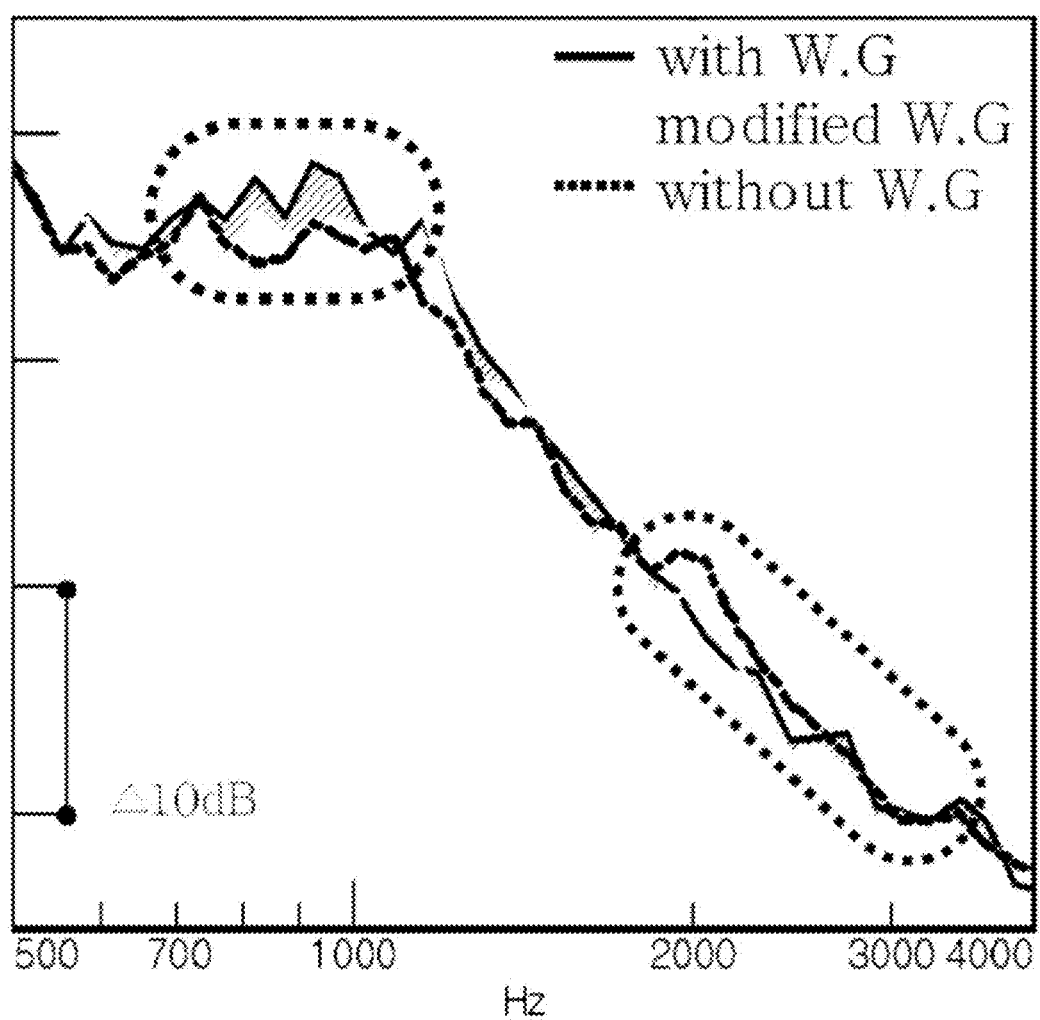
FIG. 9 is a graph showing running noise detected within the vehicle according to one exemplary embodiment of the present disclosure.

As shown in FIG. 9, when the one exemplary embodiment of the present disclosure is applied, the peak point in a target frequency range was measured to be lower than that when one exemplary embodiment of the present disclosure is not applied. Therefore, FIG. 9 shows that high-pitched peak noise, which is a tire pattern component deteriorating running noise detected in the interior of the vehicle, may be effectively removed.

In accordance with the above described low-noise pocket-type wheel guard according to one exemplary embodiment of the present disclosure, as a noise reduction pocket may be formed on the end portion of the wheel guard, in which a sound field may be expected to be formed due to tire pattern noise, formation of a sound field due to the tire pattern noise may be disturbed and prevented. Consequently, high-pitched peak noise, which is a tire pattern component deteriorating running noise detected in the interior of the vehicle, may be effectively removed.

While the present disclosure has been described with respect to the specific exemplary embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed based on the appended claims.

What is claimed is:

1. A low-noise pocket-type wheel guard, comprising:
   the wheel guard installed to face a surface of a tire of a vehicle,
   wherein a noise reduction pocket is formed at the wheel guard to protrude toward an interior of the vehicle within the wheel guard,
   wherein the wheel guard includes two end portions including a front end portion in a front direction of the vehicle and a rear end portion in a rear direction of the vehicle,
   wherein the noise reduction pocket is formed on the rear end portion of the wheel guard so as to prevent formation of a sound field of a vibration frequency corresponding to a peak point of a tire pattern noise on the wheel guard,
   wherein the wheel guard is formed in an arc shape, and
   wherein the noise reduction pocket includes:
     an inlet open toward the tire; and
     a space formed to protrude from the inlet toward the interior of the vehicle and is open toward the tire,
     wherein a height of the space perpendicular to an imaginary line parallel to a ground and in a same direction as a driving direction of the vehicle is calculated by Equation 1 below:

$$h=(1/4)\times(c/f), \qquad \text{Equation 1:}$$

wherein h indicates the height of the space, c indicates the sound velocity, and f indicates a target frequency.

2. The low-noise pocket-type wheel guard of claim 1, wherein the inlet of the noise reduction pocket is disposed on the rear end portion of the wheel guard in the rear direction of the vehicle.

3. The low-noise pocket-type wheel guard of claim 1, wherein the wheel guard is formed in an arc shape, and wherein the noise reduction pocket includes:
   a first pocket disposed on the rear end portion of the wheel guard in a driving direction of the vehicle; and a second pocket formed to be closer to a central portion of the wheel guard than the first pocket.

4. The low-noise pocket-type wheel guard of claim 1, wherein a length of the inlet is calculated by Equation 2 below:

$$a=(\tfrac{1}{2})\times(c/f)=2\times h, \qquad \text{Equation 2:}$$

wherein a indicates the length of the inlet, c indicates the sound velocity), f indicates a target frequency, and h indicates the height of the space.

5. The low-noise pocket-type wheel guard of claim 3, wherein the noise reduction pocket is formed as two noise reduction pockets in a rear direction of the vehicle; and as the two noise reduction pockets are formed to be closer to the central portion of the wheel guard, target frequencies substituted into the calculations of a length of the inlet and the height of the space are set to be decreased.

6. The low-noise pocket-type wheel guard of claim 4, wherein the height of the space includes:
   a first height that corresponds to a dimension of an edge of a lower surface of the space closest to the ground; and
   a second height that corresponds to a dimension of an edge of an upper surface of the space further from the ground than the lower surface of the space, and
   wherein the target frequencies substituted into the calculations of the first height and the second height are different from each other, and
   wherein a smallest target frequency among the target frequencies substituted into the calculations of the first height and the second height is substituted into the calculation of the length of the inlet.

7. The low-noise pocket-type wheel guard of claim 1, wherein:
   a length of an inlet perpendicular to an imaginary line parallel to the ground is determined in a range of about 12 cm to 24 cm; and
   a height of the space perpendicular to an imaginary line parallel to the ground and in the same direction as a driving direction of the vehicle is determined in a range of about 6 cm to 12 cm.

8. A vehicle having the low-noise pocket-type wheel guard according to claim 1.

\* \* \* \* \*